United States Patent [19]

Stemmer, Jr.

[11] Patent Number: 4,848,576

[45] Date of Patent: Jul. 18, 1989

[54] FILM JACKET FOR FLAT ARTICLES, PARTICULARLY SLIDE FRAMES

[75] Inventor: Gottfried Stemmer, Jr., Garmisch-Partenkirchen, Fed. Rep. of Germany

[73] Assignee: Geimuplast Peter Mundt GmbH. & Co. KG, Farchant, Fed. Rep. of Germany

[21] Appl. No.: 168,770

[22] Filed: Mar. 16, 1988

[30] Foreign Application Priority Data

Mar. 18, 1987 [DE] Fed. Rep. of Germany ....... 3708880

[51] Int. Cl.⁴ ............................................. B65D 85/00
[52] U.S. Cl. .................................. 206/456; 206/455; 40/159.2
[58] Field of Search .................. 206/455, 456; 40/159, 40/159.2

[56] References Cited

U.S. PATENT DOCUMENTS 2,154,510  4/1939  King et al. ........................ 383/38 X
3,749,237  7/1973  Dorton .............................. 383/39 X
4,533,048  8/1985  Ozeki ................................ 206/456 X
4,629,070  12/1986  Roberg ............................. 383/39 X

FOREIGN PATENT DOCUMENTS 2811019  9/1979  Fed. Rep. of Germany ...... 206/456
1000871  8/1965  United Kingdom .................. 383/38
1319905  6/1973  United Kingdom ................ 206/455

Primary Examiner—William Price
Attorney, Agent, or Firm—Fleit, Jacobson, Cohn, Price Holman & Stern

[57] ABSTRACT

A film jacket (1) for flat articles, particularly slide frames (5, 6, 7, 8), that consists of bottom and top plies (2, 3; 103), which are joined at one end and on both sides so that they can accommodate the slide frames. To permit the film jacket to be filled quickly and in a simple manner and to permit the slide frames to be individually taken, one film ply (3; 103) is formed with a transversely extending slit (15, 16, 17; 115, 116, 117) which is spaced from the closed end (4; 104) of the jacket by a distance (l) that corresponds to the length of one slide frame.

9 Claims, 1 Drawing Sheet

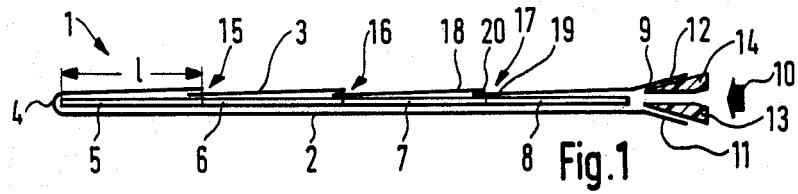
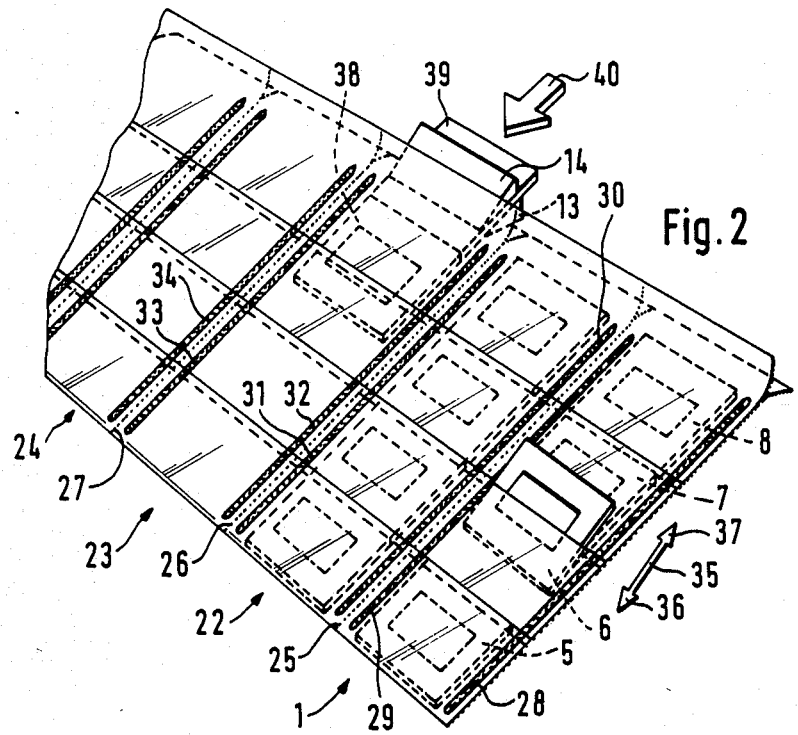
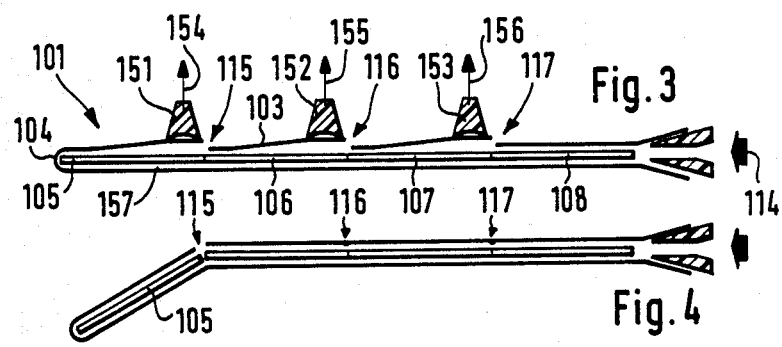

FILM JACKET FOR FLAT ARTICLES, PARTICULARLY SLIDE FRAMES

BACKGROUND OF THE INVENTION

1. Field of the Invention

This invention relates to a film jacket for flat articles, particularly slide frames, which jacket consists of top and bottom film plies, which are joined at one end and on both side edges so that they are adapted to receive the slide frames.

2. Description of the Prior Art

Such a film jacket is generally known in practice. The known film jacket consists of top and bottom film plies and has the configuration of an elongate rectangle. The two longitudinal sides of the superposed film plies are joined to each other. The two film plies are also joined at one end but are unconnected at the opposite end, where a receiving opening is provided, through which the slide frames can slidably be inserted into the tubular film, which is constituted by the two film plies and is closed at one end. The tubular film is somewhat wider than the flat slide frames which are to be slidably inserted. The slide frames are inserted successively or one behind the other into the known film jacket. A slide frame cannot be removed from the known film jacket in a simple manner unless the slide frame is nearest to the opening. When a succeeding slide frame is to be removed for a viewing of the slide, those slide frames which are nearer to the opening than the desired slide frame must be removed before so that for an access to the desired slide frame it may be necessary, in the least favorable case, to remove also all other slide frames from the film jacket if the slide frame to be taken is the rearmost one disposed at the closed end of the tubular film. It is apparent that the known film jacket does not permit a simple direct access to each of the slide frames which are kept in the jacket.

In another known system for keeping frames which is known in practice, a plurality of juxtaposed film pockets are provided, which are welded on a continuous bottom film ply. The bottom film ply and the top film ply sections which constitute the pockets may be joined by embossed portions. The system described last permits a simple and quick access to each of the slide frames which are in storage. But that system has the disadvantage that it can be filled only in a complicated operation. The slides are usually mounted by machine. When the slide frames have thus been completed they must be inserted into a film jacket. It will be of advantage to insert a plurality of complete slide frames into the film jacket through a single opening therein. That operation cannot be performed with the system described last because a separate pocket having a separate opening is provided for each complete slide frame.

Another system that is known in practice has a separate pocket with a separate opening for each slide frame. To make the film jacket, a single ply is folded in Z-shape and transverse seam welds are then formed in a direction which is transverse to the folds of the Z-shaped ply. Those transverse seam welds have a spacing which slightly exceeds the width of a slide frame. The separate pockets for keeping respective slide frames are thus formed by the combination of the ply that is folded has the same disadvantages as the one which has been described hereinbefore.

SUMMARY OF THE INVENTION

It is an object of the invention to provide for flat articles, particularly slide frames, a novel film jacket in accordance with the teachings of the invention and one which can be filled in a simple and quick operation and from which the slide frames can be taken individually.

In accordance with the invention that object is accomplished by providing a jacket comprising top and bottom film plies with one film ply being formed with a transversely extending slit, which is spaced from the closed end of the jacket by a distance (l) that corresponds to the length of one slide frame. The film jacket is constituted by bottom and top film plies, which are joined at one end on both sides, and is adapted to hold the slide frames. To fill the film jacket, the slide frames can be inserted in succession through the opening that is provided between the film plies at that end of the jacket which is opposite to the end at which the two film plies are joined. When the slide frames have slidably been inserted into the film jacket, any desired slide frame can be taken out through the transversely extending slit that is provided in one film ply without a need to shift the other slide frames or to take them out too. The transversely extending slit is spaced from the closed end of the film jacket by a distance which corresponds to the length of one slide frame. In a film jacket for keeping a plurality of slide frames, one film ply is formed with a plurality of transversely extending slits, which are spaced apart by a distance that corresponds to the length of one slide frame.

The slide frames may slidably be inserted in succession into the single opening of the film jacket so that the film jacket can be filled quickly and in a simple manner. Nevertheless, the slide frames can be taken out in a simple manner through the slits so that it is not necessary to take out slide frames in addition to the desired one.

In accordance with another development of the invention, the film ply that is slit has overlapping edges defining the slit. This will prevent an ingress of dirt and dust into the film jacket so that the slide frames will not be adversely affected. Besides, as the slide frames are slidably inserted into the film jacket they cannot strike against the film edges which define the slits. Such striking of the slide frames being inserted against exposed film edges might damage the film and might obstruct a complete filling of the film jacket.

That film ply section which is closer to the closed end of the film jacket preferably overlaps from the outside the film ply section which succeeds the slit, so that the slits are overlapped like the openings of a fish pot and a hooking of the slide frames being inserted will reliably be prevented.

The side edge of a film jacket may be joined to another film jacket. When a film jacket has been filled, the unit consisting of the two film jackets is advanced in a direction which is at right angles to the direction in which the film slides are inserted and the filling operation can then be repeated with the next film jacket.

The joint between the film jacket so that the juxtaposed film jackets can be separated in case of need. This will particularly be of advantage when a large number of film jackets are automatically filled by machine. For instance, when a film consisting of 24 or 36 frames has completely been mounted and jacketed, the film jackets may be separated at the adjoining perforation line. In that manner each film consisting of 24 or 36 frames may be accommodated in a unit consisting of a plurality of juxtaposed film jackets, which are joined to each other.

The bottom and top film plies may laterally be joined by knurled edges or by a seam weld.

The joint between the bottom and top film plies at the closed end may also be constituted by knurled edges or by a seam weld. Alternatively, a single film ply may be folded to close the jacket at one end.

The top and bottom film plies may be made of the same material or of different materials. For instance, one of the two film plies may be transparent and the other may be light-diffusing or translucent.

A process of jacketing flat articles, particularly slide frames, in a film jacket of the kind described hereinbefore is characterized in that the film ply that is slit is raised on that side of each of the slits which is nearer to the closed end of the jacket and the slide frames are subsequently slidably inserted into the jacket. In a preferred practice that film ply section is raised adjacent to the slit which succeeds the slit in the direction in which the slide frames are inserted so that a hooking of the slide frames being inserted will be prevented.

The film ply may be raised by means of vacuum cups.

In accordance with a desirable development the laterally joined film jackets are moved at right angles to the direction which the slide frames are inserted. In that case one film jacket is first filled with slide frames. When that filling operation has been completed, the unit consisting of a plurality of interconnected film jackets is advanced in a direction which is at right angles to the direction in which the slide frames are inserted so that another filling operation can then be performed.

The movement of the film jackets at right angles to the direction in which the frames are inserted may be controlled by marks, which are provided on the film jacket and are detected by a detector. In that case a next succeeding empty film jacket can exactly be positioned relative to the slide frames, which are slidably to be inserted.

The detector may consist of a light barrier for detecting optically detectable marks. In that case a friction wheel drive may be used to move the interconnected film jackets at right angles to the direction in which the slide frames are inserted.

Alternatively the marks may consist of feed perforations, which receive mating teeth of a suitable drive. In that case a traction drive may be used, which may be of the type used in the printer of a computer system.

BRIEF DESCRIPTION OF THE DRAWING

FIG. 1 is a side elevation showing a film jacket having slits defined by overlapping edges.

FIG. 2 is a perspective view showing the film jacket of FIG. 1.

FIG. 3 shows a film jacket having slits defined by non-overlapping edges.

FIG. 4 shows the same film jacket as FIG. 3 in a position for a taking of the last slide frame.

DETAILED DESCRIPTION OF THE PREFERRED EMBODIMENTS

Illustrative embodiments of the invention will now be explained in detail with reference to the drawing.

The film jacket 1 shown in FIG. 1 consists of a bottom film ply 2 and a top film ply 3, which are joined at one end 4. Between the two film plies 2 and 3, four slide frames 5, 6, 7, 8 are disposed, which have slidably been inserted in the direction indicated by the arrow 10 through the forward opening 9. It is apparent that all four slide frames can slidably be inserted in succession through a single opening 9 of the film jacket 1. The forward ends 11 and 12 of the bottom and top film plies 2 and 3 are outwardly deflected by two wedges 13 and 14 so that the slide frames can freely be inserted.

Three slits 15, 16, 17 are provided in the top film ply 3. The slit 15 is spaced from the closed rear end 4 of the film jacket 1 by a distance that corresponds to the length l of one slide frame (in the present case the slide frame 5). Similarly, the slits 15, 16, 17 are spaced a distance apart which is also equal to the length of a slide frame. The distance from the foremost slit 17 to the open forward end 12, 13 of the film jacket 1 also corresponds approximately to the length of a slide frame, in the present case of the slide frame 8. In the illustrative embodiment shown in FIG. 1 the just described distance from the foremost slit 17 to the open forward end 12, 13 of the film jacket 1 slightly exceeds the length of a slide frame so that the foremost slide frame 8 will lie entirely within the film jacket 1 with a certain margin of safety.

The top film ply 3 is formed with overlapping edges adjacent to each of the slits 15, 16, 17 in such a manner that the film ply section 19 which succeeds the slit 17 is overlapped on the outside by the film ply section 18 which is nearer to the closed end 4. For instance, as the slide frame 7 is pushed past the slit 17 to the position shown in FIG. 1, that overlap will reliably prevent a hooking of that slide frame 7 at the forward edge of the film ply 3. As is apparent from FIG. 1 the slits 15, 16, 17 are overlapped like openings in a fish pot.

All slide frames 5, 6, 7, 8 are slidably inserted in succession, one behind the other, through the opening 9 of the film jacket 1 in the direction indicated by the arrow 10. When it is desired to take one of the slide frames, this can be accomplished by removing that slide frame through the associated slit. For instance, the slide frame 7 can be taken through the slit 17. The slit 16 is associated with the slide frame 6 and the slit 15 with the slide frame 5. the foremost slide frame 8 can be taken in a simple manner through the opening 9 of the film jacket. Inclusive latter has openings or slits which are equal in number to the slide frames. Four slide frames 5, 6, 7, 8 are shown in FIG. 1 and can be taken through four openings, which consist of the slits 15, 16, 17 and the opening 9 of the film jacket 1.

FIG. 2 is a perspective view showing a plurality of the film jackets, which jackets are designated 1, 22, 23, 24 and are interconnected at their edges by perforation lines 25, 25, 27. The bottom and top films plies of a film jacket are interconnected at their sides by a seam weld 28, 29, 30, 31, 32, 34. A perforation line is provided between two outer seam welds. For instance, the perforation line 26 is provided between the left-hand seam weld 31 of the jacket 22 and the right-hand seam weld 32 of the film jacket 23. Owing to said perforation lines 25, 26, 27 the several film jackets can be separated from each other in a simple manner in case of need. In that case the film jackets may be singled or may be severed to form units consisting of a plurality of film jackets.

The double-headed arrow 35 indicates the directions in which the slide frames are inserted and removed. The arrow 36 indicates the direction in which the slide frames are inserted into the film jacket. The slide frames can individually be taken in the opposite direction 37. FIG. 2 shows the slide frame 6 in position for removal, in which one-half of the slide frame protrudes from the associated slot. For a removal of the slide frame 6 it is not necessary to remove also the slide frames 7 and 8 which precedes the slide frame 6 in the direction toward the opening of the film jacket 1.

It is apparent from FIGS. 1 and 2 that openings equal in number to the slide frames are provided for removing the individual slide frames. Any of said openings may become effective in the removal of the slide frames. On the other hand, all slide frames are inserted through a single opening, which consists of the forward opening 9 of the film jacket 1. As a result, the slide frames can be inserted in a simple manner through that opening 9 whereas each slide frame can individually be taken through the associated taking opening.

In the illustrated embodiment shown in FIG. 2 the film jackets 1 and 22 are completely filled with slide frames. The film jacket 23 is shown in a position assumed during the filling operation. The slide frame 38 has moved entirely past the receiving opening and only one-half of the slide frame 39 has been inserted into the film jacket 23 in the direction of the arrow 40. That slide frame 39 is still disposed between the wedges 13 and 14. As is apparent from FIG. 2 the slide frames 38 and 39 and the succeeding slide frames, which are not shown in FIG. 2, abut at their edges as the slide frames are inserted.

FIG. 3 shows a film jacket 101 in which the slits 115, 116, 117 are defined by nonoverlapping edges. The top film ply 103 is raised at its outside edges adjacent to the slits 115, 116, 117 by vacuum cups 151, 152, 153 in the direction indicated by the arrows 154, 155, 156. A cavity 157 is thus formed between the bottom surface of the vacuum cup 151 and the top surface of the associated portion of the top film ply 103 and a vacuum is applied to that cavity by means which are not shown on the drawing. Alternatively, a vacuum can be created in the cavity 157 in a simple manner in that the vacuum cup 151 is moved toward the top film ply 103 in a direction that is opposite to the one indicated by the arrow 154, so that the film ply 103 will snugly contact the entire concave underside of the vacuum cup 151. As the film ply 103 moves to that contacting position the air disposed between the top film ply 103 and the concave underside of the vacuum cup 151 is entirely displaced out of that region. When the vacuum cup 151 is then moved in the direction of the arrow 154, the cavity 157 will be formed owing to the elasticity of the top film ply. Air cannot enter the cavity 157 because the latter is perfectly sealed by the bottom edges of the vacuum cup 151. The increase of the volume described hereinbefore and the maintenance of a constant quantity of air in the cavity thus results in the generation of the vacuum which is required for raising the sheet ply 103.

Each vacuum cup 151, 152, or 153 raises that portion of the top film ply 103 which in the direction in which the film slides are inserted (arrow 114) succeeds the associated slit 115, 116, 117. As a result, the associated edge portions of the top film ply 103 are removed out of the region in which the slide frames 105, 106, 107, 108 can be moved so that an impact of said slide frames with the edges of the upper film ply will reliably be prevented.

In FIG. 4 the film jacket illustrated in FIG. 3 is shown in the position in which the rearmost slide frame 105 can be taken. As an angular movement is imparted to that slide frame 105, the slit 115 is expanded so that the slide frame 105 can be taken. No angular movement is imparted to the slide frames adjacent to the other slits 116 and 117 so that said slits remain closed.

I claim:

1. A film jacket for flat articles, particularly slide frames, comprising:

top and bottom film plies joined at one end and at opposite side edges, the top and bottom film plies including forward ends which together form an opening between said plies opposite said one end, one of said top and bottom film plies provided with a plurality of transversely extending slits extending between said opposite side edges and substantially parallel to said one end, one of said slits spaced apart from said one end by a distance corresponding to the length of one of said flat articles, each remaining slit spaced apart from another said slit by the same distance, wherein each of said flat articles can be inserted in succession through said opening into said film jacket and wherein the flat articles can be individually withdrawn through one of said transversely extending slits.

2. A film jacket according to claim 1, characterized in that the one of said film plies has overlapping edges adjacent to each slit.

3. A film jacket according to claim 2, characterized in that the overlapping edges include one overlapping edge closer to and another overlapping edge more remote from the closed end of the film jacket, wherein the overlapping edge closer to the closed end of the film jacket overlaps outside the overlapping edge more remote from the closed end.

4. A film jacket according to claim 1, characterized in that an additional film jacket is joined to a side edge of the film jacket.

5. A film jacket according to claim 4, characterized in that the joint between the film jacket and the laterally adjoining film jacket is perforate.

6. A film jacket according to claim 1, characterized in that the bottom and top film plies are laterally joined by knurled edges.

7. A film jacket according to claim 1, characterized in that the top and bottom film plies are laterally joined by a seam weld.

8. A film jacket according to claim 1, characterized in that the bottom and top film plies are joined at said one end by a fold line.

9. A film jacket according to claim 1, characterized in that the bottom film ply consists of a material that differs from that of the top film ply.

* * * * *